United States Patent
Pearson et al.

(10) Patent No.: US 11,592,403 B2
(45) Date of Patent: Feb. 28, 2023

(54) SHEET LIGHTING FOR PARTICLE DETECTION IN DRUG PRODUCT CONTAINERS

(71) Applicant: AMGEN INC., Thousand Oaks, CA (US)

(72) Inventors: Thomas Clark Pearson, Newbury Park, CA (US); Graham F. Milne, Ventura, CA (US); Dmitry Fradkin, Woodland Hills, CA (US); Erwin Freund, Camarillo, CA (US)

(73) Assignee: AMGEN INC., Thousand Oaks, CA (US)

( * ) Notice: Subject to any disclaimer, the term of this patent is extended or adjusted under 35 U.S.C. 154(b) by 0 days.

(21) Appl. No.: 17/414,544

(22) PCT Filed: Dec. 16, 2019

(86) PCT No.: PCT/US2019/066458
§ 371 (c)(1),
(2) Date: Jun. 16, 2021

(87) PCT Pub. No.: WO2020/131666
PCT Pub. Date: Jun. 25, 2020

(65) Prior Publication Data
US 2022/0057336 A1 Feb. 24, 2022

Related U.S. Application Data

(60) Provisional application No. 62/780,542, filed on Dec. 17, 2018.

(51) Int. Cl.
*G01N 21/90* (2006.01)
*H04N 9/04* (2006.01)
(Continued)

(52) U.S. Cl.
CPC ....... *G01N 21/9027* (2013.01); *G06T 7/0004* (2013.01); *H04N 5/2354* (2013.01);
(Continued)

(58) Field of Classification Search
CPC ...... G01N 21/9027; G01N 2201/06113; G06T 7/0004; G06T 2207/10024;
(Continued)

(56) References Cited

U.S. PATENT DOCUMENTS 5,280,170 A * 1/1994 Baldwin ................ G01N 21/90
250/223 B
7,826,653 B2 * 11/2010 Mori ........................ G01P 5/20
382/218

(Continued)

FOREIGN PATENT DOCUMENTS

DE 102013222827 A1 5/2015
EP 1241467 A2 9/2002
(Continued)

OTHER PUBLICATIONS

Search Report and Written Opinion in International Application No. PCT/SG2019/066458 dated Apr. 17, 2020, 15 pages.
(Continued)

*Primary Examiner* — Boubacar Abdou Tchoussou
(74) *Attorney, Agent, or Firm* — Marshall, Gerstein & Borun LLP

(57) ABSTRACT

In a method for imaging a container holding a sample, the container is illuminated with a laser sheet that impinges upon the container in a first direction corresponding to a first axis. A plane of the laser sheet is defined by the first axis and a second axis orthogonal to the first axis. The method also includes capturing, by a camera having an imaging axis that is substantially orthogonal to at least the first axis, an image of the container. The method further includes analyzing, by
(Continued)

one or more processors, the image of the container to detect particles within, and/or on an exterior surface of, the container.

15 Claims, 10 Drawing Sheets

(51) Int. Cl.
    *G06T 7/00*           (2017.01)
    *H04N 5/235*        (2006.01)
    *H04N 5/247*        (2006.01)

(52) U.S. Cl.
    CPC .......... *H04N 5/247* (2013.01); *H04N 9/0451* (2018.08); *G01N 2201/06113* (2013.01); *G06T 2207/10024* (2013.01); *G06T 2207/10152* (2013.01)

(58) Field of Classification Search
    CPC ........ G06T 2207/10152; H04N 5/2354; H04N 5/247; H04N 9/0451
    See application file for complete search history.

(56) References Cited

U.S. PATENT DOCUMENTS

| | | | | |
|---|---|---|---|---|
| 8,036,444 B2* | 10/2011 | Nielsen | ............... | G01N 21/9027 382/142 |
| 8,895,778 B2* | 11/2014 | Srinivasan | ............ | C07C 51/412 562/593 |
| 10,126,226 B2* | 11/2018 | Matayoshi | ............ | C07K 16/241 |
| 10,132,736 B2* | 11/2018 | Matayoshi | .............. | G01N 15/06 |
| 2007/0268602 A1* | 11/2007 | Mori | ........................ | G01P 5/001 359/871 |
| 2008/0230720 A1* | 9/2008 | Nielsen | .............. | G01N 21/9027 250/492.1 |
| 2013/0096342 A1* | 4/2013 | Srinivasan | .............. | C07C 51/09 562/589 |
| 2013/0316934 A1* | 11/2013 | Matayoshi | .............. | G01N 21/51 382/128 |

FOREIGN PATENT DOCUMENTS

| | | |
|---|---|---|
| EP | 1241467 A3 | 12/2002 |
| EP | 3062292 A1 | 8/2016 |
| JP | S62220844 A | 9/1987 |
| JP | H0579999 A | 3/1993 |
| WO | WO-92/14142 A1 | 8/1992 |
| WO | WO-2017/200939 A1 | 11/2017 |

OTHER PUBLICATIONS

Zhang et al., "Automated Machine Vision System for Liquid Particle Inspection of Pharmaceutical Injection", IEEE Transactions on Instrumentation and Measurement, vol. 67, No. 6, Jun. 2018, 20 pages.
European Patent Application No. 19839297.9, Communication Pursuant to Article 94(3) EPC, dated Oct. 11, 2022.

* cited by examiner

900

```
┌─────────────────────────────────────────────┐
│  ILLUMINATE CONTAINER WITH LASER SHEET      │
│  THAT IMPINGES UPON CONTAINER IN A FIRST    │── 902
│  DIRECTION CORRESPONDING TO A FIRST AXIS,   │
│  WHERE A PLANE OF THE LASER SHEET IS        │
│  DEFINED BY THE FIRST AXIS AND A SECOND     │
│  AXIS ORTHOGONAL TO THE FIRST AXIS          │
└─────────────────────────────────────────────┘
                       │
                       ▼
┌─────────────────────────────────────────────┐
│  CAPTURE, BY IMAGER HAVING AN IMAGING AXIS  │── 904
│  SUBSTANTIALLY ORTHOGONAL TO AT LEAST THE   │
│  FIRST AXIS, AN IMAGE OF THE CONTAINER      │
└─────────────────────────────────────────────┘
                       │
                       ▼
┌─────────────────────────────────────────────┐
│  ANALYZING IMAGE OF CONTAINER TO DETECT     │── 906
│  PARTICLES WITHIN, AND/OR ON EXTERIOR       │
│  SURFACE OF, CONTAINER                      │
└─────────────────────────────────────────────┘
```

*FIG. 9*

SHEET LIGHTING FOR PARTICLE DETECTION IN DRUG PRODUCT CONTAINERS

CROSS-REFERENCE TO RELATED APPLICATION

Priority is claimed to U.S. Provisional Patent Application No. 62/780,542, filed Dec. 17, 2018, the entire contents of which are hereby incorporated herein by reference.

FIELD OF DISCLOSURE

The present application relates generally to particle detection techniques, and more specifically to particle detection techniques capable of distinguishing particles within a container (e.g., syringe, vial, etc.) from particles on the outside surface of the container.

BACKGROUND

Foreign particles in drug product containers pose a serious health and safety risk for patients, particularly with respect to injected drug products. While automated visual inspection equipment can in some cases detect particles in containers holding liquid products with acceptable accuracy, there can be a large number of false rejects, e.g., due to small particles and blemishes on the exterior of the container wall, defects on the interior of the container wall or in the bulk of the container wall (e.g., cracks), and/or small bubbles on the inside of the container wall.

A conventional imaging system 100 is shown in FIG. 1. As seen in FIG. 1, a container 102 filled with a sample (e.g., liquid drug product) is illuminated by two angled lights 104A and 104B, which are positioned so as to generally oppose a camera 106 on the other side of container 102. Lights 104A and 104B are directional, with most of the emitted light propagating in a direction orthogonal to the planar surfaces shown in FIG. 1 (i.e., as shown by the arrows in FIG. 1). This requires that each of lights 104A, 104B be large enough to evenly illuminate the entire container. Since most of the emitted light is not directed at the lens of camera 106, the resulting image is a dark background against bright particles, if any particles exist. FIG. 2 depicts another conventional imaging system 200 that is typically used for larger, opaque particles (over 500 um), or fibers that might be stuck to the inside wall of the container. As seen in FIG. 2, container 202 is illuminated by a back light 204, opposite camera 206. In this case, camera 206 images the shadow cast by a particle, and the particle appears as a black object against a relatively bright background.

A problem with both of these conventional illumination approaches is that the entire container is flooded with light, such that particles and surface blemishes on both the inside and the outside of the container are illuminated. As a result, it can be difficult to distinguish particles inside the container from particles outside the container. Because particles outside the container may not be relevant to a quality control procedure, this difficulty heightens the risk of false positives. For rear, angled light arrangements such as imaging system 100, a technique known as "image subtraction," or "minimum intensity projection" (MIP), is commonly used to distinguish smaller particles (~100-500 um) inside the container from particles outside the container. This technique involves spinning the container about its central axis at high speed (~600-5000 RPM), stopping the spinning abruptly, acquiring a series of images of the stopped container at approximately 10 to 50 ms intervals, and then subtracting subsequent images such that only those objects that moved between images appear in the resulting difference image. This effectively cancels out the small particles and surface blemishes that may be on the outside of the container, while highlighting objects that are suspended in, and carried by the momentum of, the liquid in the container. However, this technique may be inadequate for highly viscous drug products, as there may be very little or no motion of the fluid and particles after the container stops spinning. Back-lit arrangements such as imaging system 200 also have drawbacks, as they can "bleach out" small particles, or particles that are not opaque, and generally depend on particles inside the container being large enough to be distinguished from the smaller particles that typically reside on the exterior surface of containers.

Some manufacturers of automated inspection equipment for pharmaceutical products have proposed, and implemented, techniques that attempt to address these problems. For example, U.S. Pat. No. 8,036,444 (Nielsen), entitled "Method and System for Irradiating and Inspecting Liquid-Carrying Containers," describes an imaging system in which two line scan cameras generate flattened images of a spinning container. One camera is aligned with the central axis of the container, while the other camera is offset from the central axis. The technique leverages the basic principle that, when the container is rotated, particles on the outside of a container will move a longer distance horizontally (i.e., in a direction orthogonal to the container central axis) than particles inside the container. Images from the two line scan cameras are compared after multiple images have been acquired at different rotations, and the distances between particles are computed. This distance can in some cases be used to distinguish particles on the inside and outside of the container.

As another example, European Patent No. 3,062,292 (Kwoka), entitled "Inspection Method and Inspection Device for Monitoring Production Processes," describes an imaging system that uses a single area scan camera. When a particle is detected at a position along the central axis of the container, the position is digitally shifted to a point where it would be if it were on the outside of the container and the container were precisely rotated about its central axis a preset angle (~45°). The container is then rotated and a new image is taken. If the particle is in fact on the outside of the container, it should overlap with the digitally shifted image. If the particle is instead inside the container, it will be offset from the digitally shifted particle by some amount.

While the techniques of U.S. Pat. No. 8,036,444 (Nielsen) and European Patent No. 3,062,292 (Kwoka) may improve upon the conventional image subtraction method described above in some respects, both approaches have significant drawbacks of their own. One difficulty is that, with both approaches, any slight vibration of the container between images can cause significant errors. Moreover, if a particle on the inside of the container "slips" while the container is rotated, it may not be in the expected position to be properly detected. Furthermore, limitations on the spatial resolution of imagers may make the techniques insufficient to distinguish small blemishes inside the glass, which can be a large source of false rejects.

Further, while promising 3D imaging techniques are being developed and offer the ability to determine particle size and morphology from images, they are very computationally expensive, and may not work at typical manufacturing line rates (e.g., 300 to 600 containers per minute). Accordingly, there remains a need for improved methods to detect particles inside liquid-filled drug product containers, particularly (but not only) for containers holding highly viscous samples/products.

SUMMARY

Embodiments described herein relate to systems and methods that improve upon conventional automated visual inspection techniques. In particular, an imaging system illuminates a container with a relatively thin sheet of laser light, with the laser sheet impinging upon the container from a direction substantially orthogonal to the imaging axis of the camera. The laser sheet may pass through the central axis of the container, for example. With this lighting configuration, particles can only be seen in the resulting image (or can only be seen with a certain intensity level, etc.) if those particles are within the thickness of the laser sheet. Thus, by using the laser sheet and the orthogonal orientation of the camera, it can easily be determined whether a particle seen in an image is inside or outside of the container: any imaged particles that are outside the container will be outside the container walls in the image, and any imaged particles that are inside the container will be between the container walls in the image.

In some embodiments, the container is rotated a number of times about its central axis, and imaged at each rotation while the laser sheet is still applied, in order to inspect the entire volume of the drug product (or other sample) within the container. While numerous rotations may be required, the image processing and computational load can be very light, and the probability of false rejects can be very low. Moreover, the technique has the unexpected benefit that some of the laser light scatters within the sample, or refracts at the container/sample (e.g., glass/liquid) interface, and travels around the inside perimeter of the container (e.g., if the container is cylindrical). This scattered or refracted light may illuminate bubbles that are located anywhere inside the container, even if those bubbles do not intersect the laser sheet. This phenomenon results from the large difference in refractive index at the surface (which causes substantial reflection and refraction), and may be leveraged to distinguish bubbles from particles (e.g., debris, protein aggregates, etc.) with greater accuracy than other approaches that rely solely on the different morphologies of bubbles and particles. The ability to better discriminate bubbles (which are typically benign) from other particles can be important, as bubbles are typically a significant source of false rejects (e.g., when using conventional image subtraction methods).

Other, more complex arrangements may be used to build upon the laser sheet technique. For example, two laser sheets that oppose each other by 180 degrees (both orthogonal to a single camera) may be used, to compensate for the fact that the optical scattering of a laser sheet is different where the laser sheet enters the container as compared to where the laser sheet exits the container. This may reduce the number of required rotations/images by a factor of two. As another example, one or more additional laser sheets may be applied at angles oblique to a first laser sheet, in order to better image particular areas of the container (e.g., a shoulder or stopper area). As yet another example, the imaging system may include a first laser source that generates a laser sheet of one color (e.g., red), and a second laser source that generates a laser sheet of another color (e.g., blue), with some angular offset between the two laser sheets relative to the central axis of the container. Two cameras (each tuned to a different one of the two colors) may then simultaneously capture images. Alternatively, a single camera may be used (e.g., with one or more mirrors, prisms, and/or other optical components) to capture images that preserve the visual information provided by the illumination of each of the differently colored laser sheets (e.g., using a camera that implements a Bayer filter, or using a camera that includes optics and filters to map the different colors of the two laser sheets to different parts of the camera sensor). Whether one or two cameras are used, this approach may reduce the number of required rotations/images by a factor of two (or possibly three, if three differently colored laser sheets are used). As still another example, the imaging system may include a laser source that generates a laser sheet of one color (e.g., red), and an illumination source that generates light of another color (e.g., blue) that illuminates essentially the entire container volume. By using cameras tuned to different colors, it is possible to discriminate between particles inside and outside the container in one plane (within the laser sheet), and simultaneously obtain a snapshot of the entire volume (using the other illumination source).

The techniques described above, and elsewhere herein, may provide a number of advantages, such as making possible the automated detection of fibers and other particles in highly viscous products, allowing accurate automated detection of small particles stuck to the inside wall of a container, improving the discrimination of bubbles from particles inside the container, avoiding false detection or other problems arising from small blemishes on the inside wall of the container, reducing the risk of non-compliance due to particles that are not actually inside the container or due to bubbles (i.e., reducing false rejects, which can result in an entire batch of a drug product being discarded), reducing the need for costly manual inspection to avoid false rejects, and/or reducing patient risk. Moreover, it may be possible to implement the techniques by retrofitting current automated inspection equipment with minimal hardware changes (e.g., simply by adding one or more laser sources).

BRIEF DESCRIPTION OF THE DRAWINGS

The skilled artisan will understand that the figures, described herein, are included for purposes of illustration and do not limit the present disclosure. The drawings are not necessarily to scale, and emphasis is instead placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

FIG. 9 is a flow diagram of an example method for imaging a container containing a sample.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
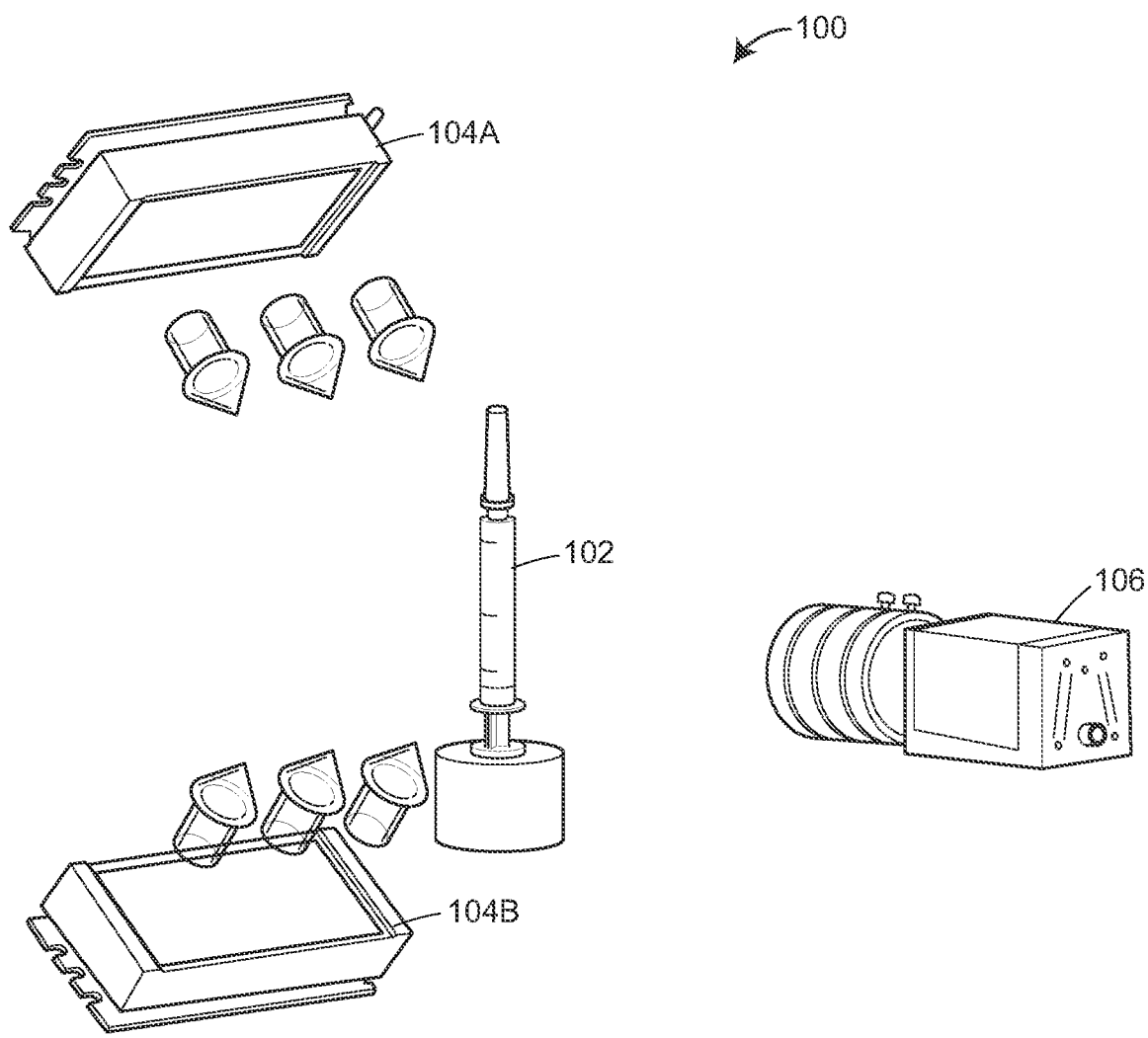
FIGS. 1 and 2 depict conventional imaging systems for particle detection.
Figure 2:
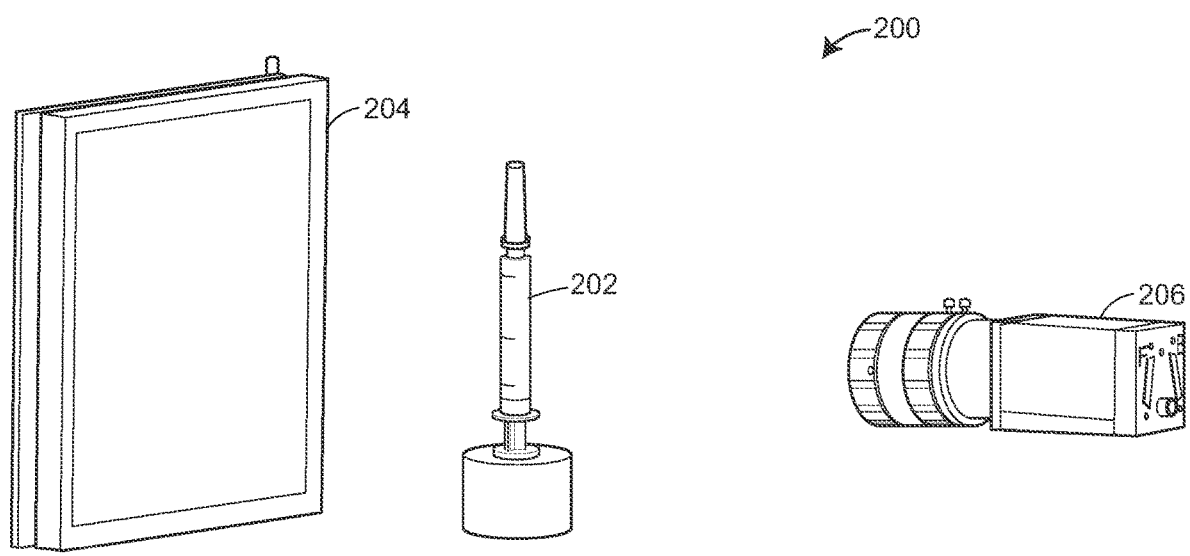
Figure 3A:
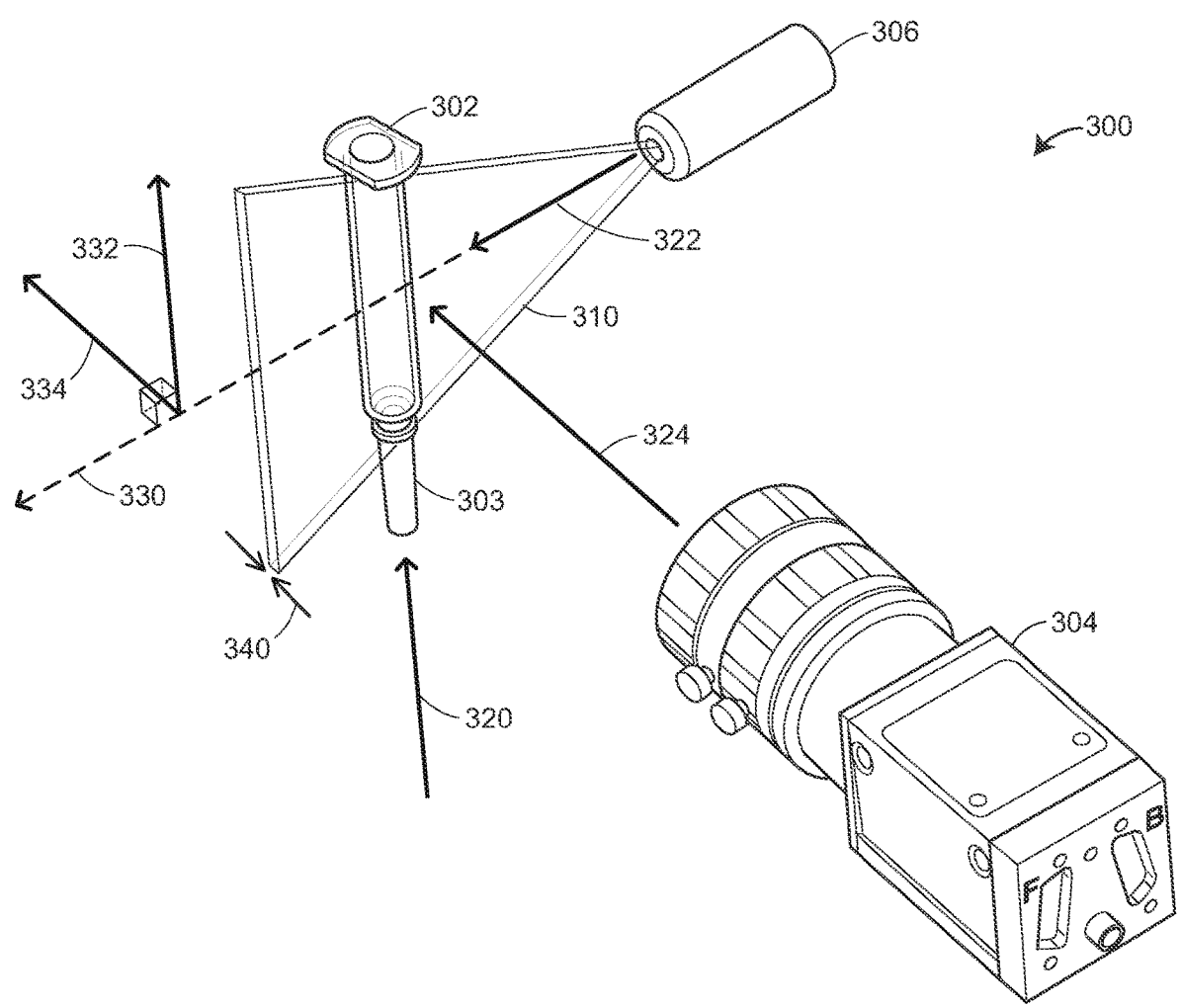
FIGS. 3A and 3B depict different perspectives of a first embodiment of an example imaging system operating according to the principles described herein.
Figure 3B:
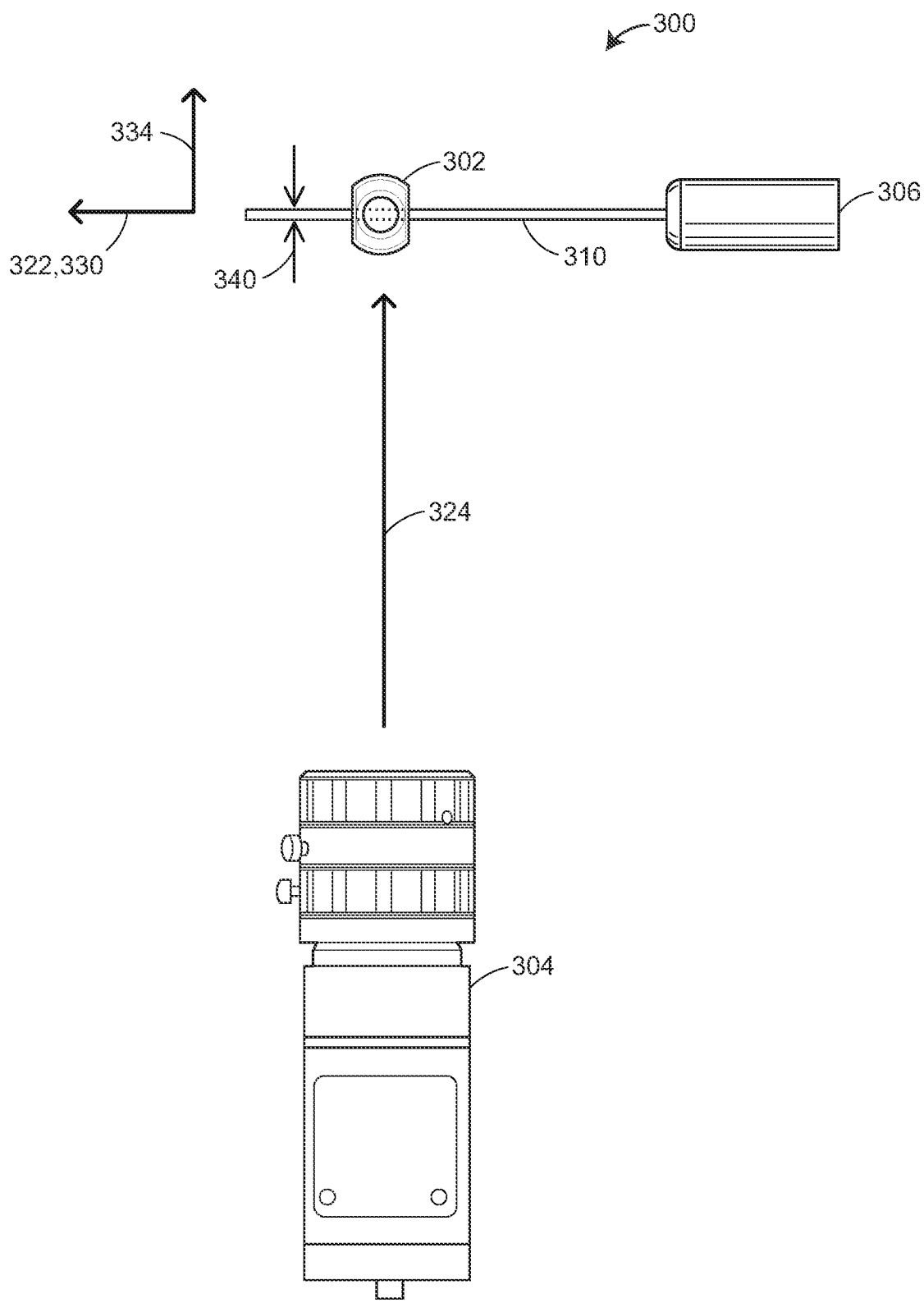

A first embodiment is shown in FIGS. 3A and 3B, which provide different perspectives of an example imaging system 300. Specifically, FIG. 3A provides an off-axis perspective view, while FIG. 3B provides a top-down view. In FIGS. 3A and 3B, one or more images of a container 302 (in a holder 303) are captured by an imager 304, while container 302 is being illuminated by a laser source 306. While container 302 is depicted as a syringe in FIGS. 3A and 3B, it is understood that container 302 may instead be any other suitable type of container, and may have any suitable size and shape. For example, container 302 may instead be a vial, a test tube, a cartridge, and so on. Container 302 may be made of glass, plastic, or any other suitable material (or combination of materials) that is at least partially transparent or translucent so as to allow the passage of light from laser source 306, and the passage of light to imager 304. In operation, container 302 may hold a liquid sample. In some use cases, however, container 302 may hold a non-liquid sample, such as a lyophilized or frozen sample.

Holder 303 may include any hardware needed to maintain container 302 in a desired position, and to rotate container 302 to allow imager 304 to capture images from other perspectives. Holder 303 may be just one portion of some suitable means for positioning container 302 in one or more desired positions and/or orientations. The positioning means may include any suitable combination of hardware, firmware and/or software, depending on the requirements of imaging system 300. For example, the positioning means may merely include a platform (e.g., flat base component) from which holder 303 vertically protrudes, either in a fixed orientation or such that holder 303 can be rotated. In other embodiments, however, the positioning means may include automated/robotic hardware (e.g., a robotic arm that includes holder 303 or another suitable holding means such as "fingers" that can grasp/pinch container 302). In these latter embodiments, the positioning means may also include a processing unit (e.g., a microprocessor, and/or an application specific integrated circuit (ASIC) or field-programmable gate array (FPGA), etc.), and a memory (e.g., a solid state memory or hard drive memory) storing instructions that the processing unit can execute to grasp/hold/fix, shift, and/or rotate container 302. Other positioning means are of course also possible.

Imager 304 may be a camera including one or more charge-coupled device (CCD) sensors, for example. Alternatively, imager 304 may include one or more complementary metal oxide semiconductor (CMOS) sensors, and/or any other suitable type of imaging device/sensor. Imager 304 may include a telecentric lens, for example, or any other suitable lens (or combination of multiple lenses). In various embodiments, imager 304 may include any suitable combination of hardware and/or software, such as image sensors, optical stabilizers, image buffers, frame buffers, frame grabbers, and so on. More generally, imaging system 300 may include any suitable means for capturing one or more images of container 302 (or another suitable container), with the imaging means including imager 304 and/or any other suitable imaging device or devices (e.g., imager 304 plus one or more mirrors, additional lenses, etc.).

Laser source 306 generates a laser sheet 310 that generally conforms to a plane. While laser sheet 310 is referred to herein as a "sheet," it is understood that real-world limitations on laser source 306, as well as the media that laser sheet 310 passes through (i.e., air or other gases, the walls of container 302, and the liquid or other sample within container 302), will prevent laser sheet 310 from forming a uniformly flat sheet. For example, laser sheet 310 will experience some diffusion when entering container 302, and when exiting container 302. In some embodiments, laser source 306 is a diode laser with 1 to 5 mW power, 30 to 60 degree line fan angle, and 1 to 1.5 mm line width (thickness). In one embodiment, laser source 306 is the Edmund Optics Micro VLM Laser Diode Line part #52-267, with 3.5 mW power, 670 nm wavelength, and 60 degree line fan angle. In another embodiment, laser source 306 is the Edmund Optics Micro VLM Laser Diode Line part #52-268, with 1.6 mW power, 670 nm wavelength, and 30 degree line fan angle. More generally, imaging system 300 may include any suitable means for generating laser sheet 310, such as laser source 306 or another suitable laser source. In some embodiments (e.g., if container 302 is dark brown in order to block visible light), laser source 306 generates laser sheet 310 using infrared laser light. As the term is used herein, "light" does not necessarily refer to the portion of the electromagnetic spectrum that is visible to humans.

As seen in the example embodiment of FIG. 3A, laser sheet 310 impinges upon container 302 in a direction 322 that corresponds to (i.e., aligns with) a first axis 330, and generally conforms to a plane defined by the first axis 330 and a second, orthogonal axis 332. The second axis 332 is, in the depicted embodiment, parallel to the central axis 320 of container 302. Moreover, as shown more clearly in FIG. 3B, an imaging axis 324 of imager 304 passes through the center of container 302 (i.e., through central axis 320), in the depicted embodiment. The imaging axis 324 of imager 304 is substantially parallel to a third axis 334, where the third axis 334 is orthogonal to both the first axis 330 and second axis 332. The term "substantially" is used, in this context, to reflect the fact that the alignment of components is never absolutely perfect, and to indicate that small deviations may be acceptable so long as they do not destroy the primary benefits provided by the techniques described herein. For example, in some use cases, imaging axis 324 may be within five degrees of perfect orthogonality to axes 330 and 332, or within three degrees, within two degrees, within one degrees, etc.

Laser sheet 310 has a finite thickness 340 that covers a small range of the third axis 334. Thickness 340 may represent a 3 times beamwidth of laser sheet 310 along the third axis 334, for example. Because laser source 306 is not ideal (theoretically perfect), thickness 340 is not precisely uniform at all points along the axis 330. At least at the locations where laser sheet 310 enters container 302, however, thickness 340 is substantially less than the diameter of container 302. Thickness 340 may be set as a design parameter based on both the size (e.g., diameter) of container 302 and the desired (or maximum acceptable, etc.) number of rotations/images. In particular, thickness 340 may be set such that, when container 302 is rotated a certain number of times (to allow imager 304 to capture images from those perspectives), and with a certain angular offset per rotation, all portions of the volume of container 302 (or some large percentage thereof) will eventually become illuminated. This may also require consideration of whether, for any given rotational position of container 302, laser sheet 310 sufficiently illuminates both sides of container 302 (i.e., both where laser sheet 310 enters container 302, and where laser sheet exits container 302). For example, if container 302 is to be rotated/imaged 90 times for full coverage, and if laser sheet 310 sufficiently illuminates both the entry and exit sides of container 302, thickness 340 may be set such that laser sheet 310 covers 1/90th (or just over 1/90th) of the circumference of container 302, with half of that coverage corresponding to where laser sheet 310 enters container 302 and half of that coverage corresponding to where laser sheet 310 exits container 302. On the other hand, if laser sheet 310 does not sufficiently illuminate the exit side of container 302, thickness 340 may still be set such that laser sheet 310 covers about 1/90th of the circumference of container 302, but now with all of that coverage occurring where laser sheet 310 enters container 302. Thus, for example, thickness 340 may be set to roughly 2 mm if the diameter of container 302 is 100 mm and laser sheet 310 adequately illuminates both container sides: 100 mm*π/(90 rotations)=3.49 mm/rotation of coverage by laser sheet 310 (with half of the coverage occurring on each side of container 302 such that thickness 340 can be 3.49 mm/2=1.74 mm, allowing an extra 0.26 mm of thickness to ensure full coverage). Conversely, thickness 340 may be set to roughly 4 mm (or, alternatively, the number of rotations increased from 90 to 180) if laser sheet 310 does not adequately illuminate the exit side of container 302.

While thickness 340 may be constrained on the low end by what is required to give full coverage/illumination, thickness 340 may be constrained on the high end by the need to avoid illuminating too much of the wall of container 302 for any given rotation/image. In particular, the improved discrimination offered by imaging system 300 begins to diminish if laser sheet 310 illuminates any particles that are outside of container 302 but nonetheless appear (from the perspective of imager 304) to be between the outermost boundaries of container 302. In various embodiments, thickness 340 is greater than zero but less than 1 mm, less than 2 mm, less than 3 mm, less than 4 mm, less than 5 mm, etc. Stated as a range, in various embodiments, thickness 340 may be somewhere between 1 and 3 mm, somewhere between 1 and 5 mm, somewhere between 0.5 and 5 mm, etc.

In some embodiments, the distance of laser source 306 from container 302, and the beam angle of laser sheet 310 along the second axis 332, may be fixed such that laser sheet 310 illuminates an entire cross-section of container 302 in the plane defined by axes 330, 332. In other embodiments, however, laser sheet 310 only illuminates a smaller cross-section of container 302 (e.g., excluding a shoulder or stopper area as shown in FIG. 3A, and/or only including an area known to hold a sample, etc.). Moreover, in some embodiments, laser sheet 310 does not fan out at a particular beam angle. For example, laser source 306 may instead generate a more collimated sheet (e.g., a laser sheet covering a substantially fixed/constant range of the second axis 332), such as by illuminating a series of cylindrical lenses with a normal Gaussian laser beam.

In some embodiments, imaging system 300 is configured differently than shown in FIGS. 3A and 3B. For example, imager 304 may be positioned such that the imaging axis 324 is parallel with (e.g., aligned with) the central axis 320 of container 302. As another example, the imaging axis 324 of imager 304 may be angled such that it is slightly elevated above, or slightly declined below, the plane defined by the axes 330, 334. As yet another example, the direction 322 of laser sheet 310 may be angled such that it is slightly elevated above, or slightly declined below, the plane defined by the axes 330, 334 (e.g., to better illuminate a shoulder or stopper area, etc.). As still another example, imaging system 300 may include one or more additional imagers and/or illumination sources (e.g., as discussed below with reference to FIGS. 5 through 7).

Figure 4:
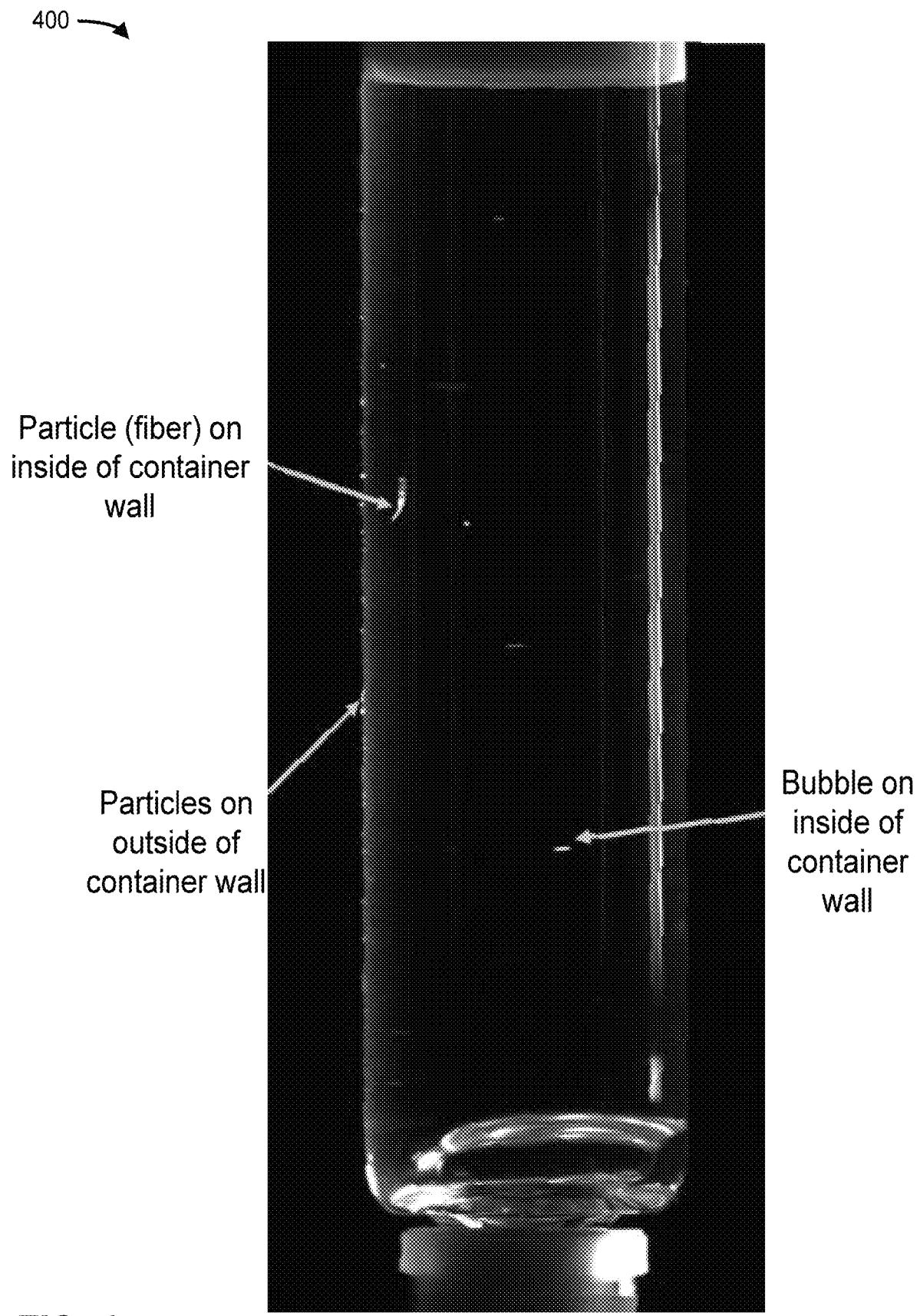
FIG. 4 depicts an example image of a container illuminated by an imaging system similar to the imaging system of FIGS. 3A and 3B.

FIG. 4 depicts an example image 400 of a container illuminated by an imaging system, such as imaging system 300 of FIGS. 3A and 3B. The imaged container may be container 302 when being illuminated by laser sheet 310, for example. In particular, FIG. 4 corresponds to a scenario in which the laser sheet impinges upon the container from the left side of the area depicted in image 400, and an embodiment in which the laser sheet does not adequately illuminate the exit side of the container (i.e., the right side of the area depicted in image 400).

Because the thickness of the laser sheet (e.g., thickness 340 of FIGS. 3A and 3B) only illuminates a small "slice" of the container at any one time/rotation, any particles on the outside of the container (e.g., dust or fibers) are only illuminated (at least, at a level sufficient for clear imaging) along the portion of the container wall that faces the laser sheet source (e.g., where a curving container wall has a surface normal vector that is substantially orthogonal to the imaging axis). Thus, any particles that are on the outside of the container wall will only be visible (or only be clearly visible) when an image shows those particles being unambiguously outside of the container. In the example image 400, this means that particles on the outside of the container only appear immediately to the left of (and in contact with) the container wall. In embodiments where the laser sheet also adequately illuminates the exit (right) side of the container, the image may also show external particles as being immediately to the right of (and in contact with) the container. Any external particles located on other portions of the container wall, however (i.e., on a part of the wall nearer to the center of image 400) would not be illuminated, or at best would be only very faintly illuminated by scattered/refracted light. Accordingly, any particles shown between the left-most and right-most bounds of the container in image 400 would unambiguously be inside the container (i.e., within the portion/slice of the sample illuminated by the laser sheet as it passes through the interior of the container).

As seen in FIG. 4, the laser sheet illuminates a number of small, dust-like particles on the left side of the exterior of the container, as well as a larger particle (a fiber) just inside the left-side wall of the container. A small particle inside the container is also seen in image 400, a short distance to the right of the fiber. As used herein, the term "particle" refers to any object that is small relative to the container and solid (e.g., a fiber or other debris, or a protein aggregate, etc.), or possibly a microemulsion, in some use cases.

A secondary benefit of imaging with the laser sheet is that bubbles may be illuminated anywhere they are present within the container, even if those bubbles do not intersect the laser sheet. This is caused by the high reflectivity of bubbles, and the fact that some of the laser light scatters and/or refracts at the container/sample interface and/or due to interactions with objects within the sample. One such bubble is depicted in FIG. 4. As a result, it may be easier to distinguish bubbles from particles. For example, automated image analysis/processing may initially count an object appearing between the walls of the container as a "candidate" particle, but then decide that the object is a bubble rather than an actual particle if other images, at other rotation points, continue to show the object at positions that would be expected based on the initial object position and the known rotation angle. Conversely, the automated image analysis/processing may identify an object (candidate particle) as an actual particle if the object does not reappear in the corresponding positions of other images at other rotations.

Figure 5:
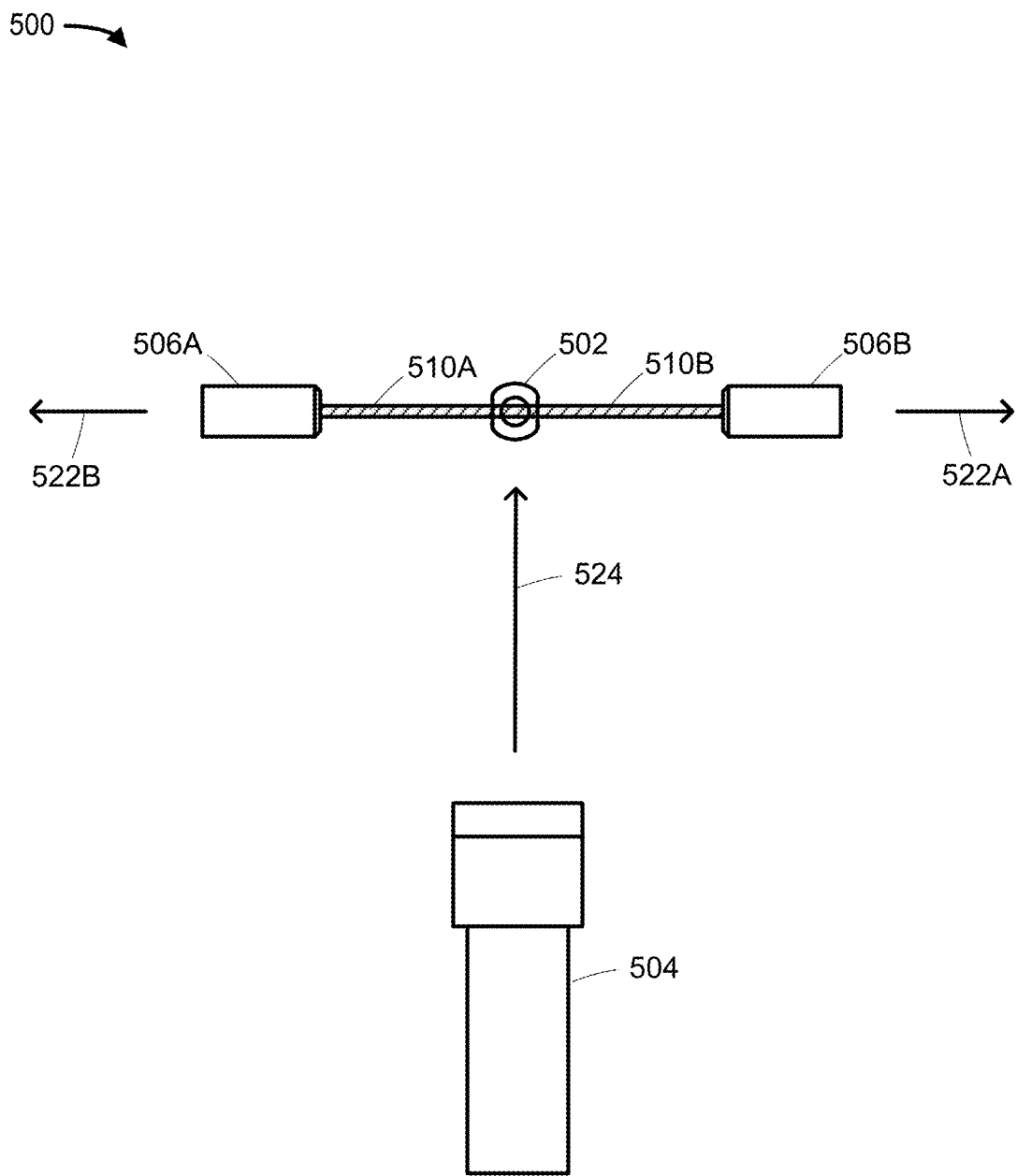
FIG. 5 depicts a second embodiment of an example imaging system operating according to the principles described herein.

FIG. 5 depicts an alternative embodiment in which an imaging system 500 images a container 502 using an imager 504, a first laser source 506A and a second laser source 506B, with laser sources 506A and 506B facing in directions that are opposed by 180 degrees. Referring to FIGS. 3A and 3B, container 502 may be similar to container 302, imager 504 may be similar to imager 304, and each of laser sources 506A and 506B may be similar to laser source 306, for example. Laser sources 506A and 506B generate laser sheets 510A and 510B, respectively, each of which may be similar to laser sheet 310 of FIGS. 3A and 3B. In imaging system 500, however, laser sheet 510A impinges upon container 502 in a direction 522A and laser sheet 510B impinges upon container 502 in the opposite direction 522B. An imaging axis 524 of imager 504 is substantially orthogonal to directions 522A and 522B.

By using a second, opposing laser source, imaging system 500 may better illuminate both sides of container 502 (i.e., the "left" and "right" sides, from the perspective of imager 504) at each rotation of container 502, thereby reducing the required amount of rotations and images by half. Or, if the number of rotations/images is not reduced, the second laser source may allow each of laser sheets 510A and 510B to have roughly half the thickness (relative to thickness 340 of laser sheet 310), which may help ensure that no illuminated particles on the outside of container 502 appear to be just inside the walls of container 502 (e.g., close to, but between, the left- and right-most edges of container 400 in FIG. 4).

Figure 6:
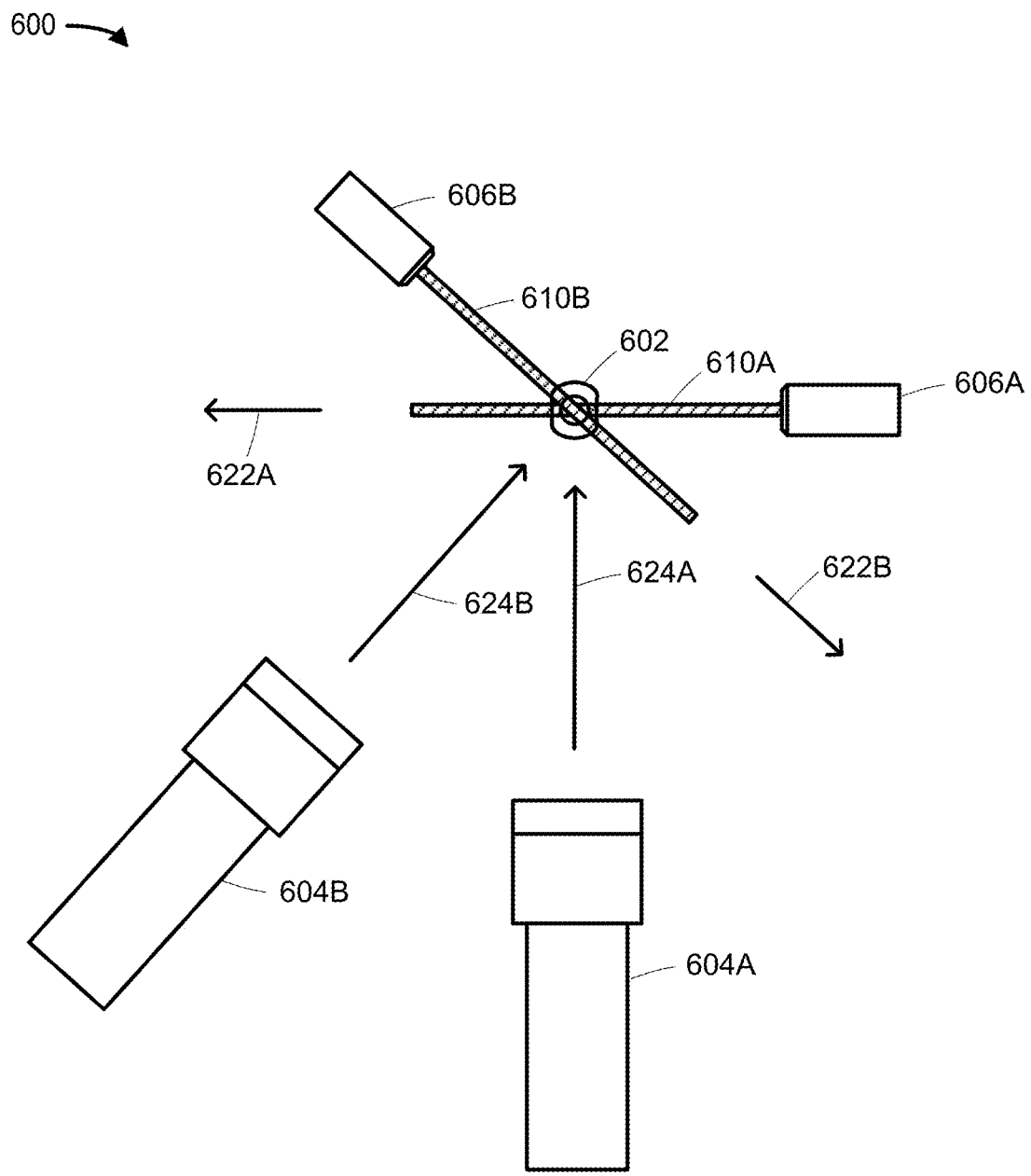
FIG. 6 depicts a third embodiment of an example imaging system operating according to the principles described herein.

FIG. 6 depicts another alternative embodiment, in which an imaging system 600 images a container 602 using a first imager 604A, a second imager 604B, a first laser source 606A and a second laser source 606B. Referring to FIGS. 3A and 3B, container 602 may be similar to container 302, each of imagers 604A and 604B may be similar to imager 304, and each of laser sources 606A and 606B may be similar to laser source 306, for example. In the embodiment of FIG. 6, a laser sheet 610A generated by laser source 606A (e.g., similar to laser sheet 310) impinges upon container 602 in a first direction 622A, and a laser sheet 610B generated by laser source 606B (e.g., also similar to laser sheet 310) impinges upon container 602 in a second direction 622B that is neither parallel nor orthogonal to the first direction 622A. For example, there may be a 135 degree angular displacement (or 150 degrees, 120 degrees, 60 degrees, 30 degrees, etc.) between directions 622A and 622B. An imaging axis 624A of imager 604A is substantially orthogonal to the first direction 622A, and an imaging axis 624B of imager 604B is substantially orthogonal to the second direction 622B.

Laser sources 606A and 606B may generate light of different wavelengths/colors. For example, laser sheet 610A may be red, while laser sheet 610B may be blue, or green, etc. Moreover, optical filters of imagers 604A and 604B may only pass the color of the corresponding laser source (e.g., imager 604A may be configured to image red light and not blue light, and imager 604B may be configured to image blue light and not red light). By utilizing different colors, imaging system 600 allows simultaneous imaging by imagers 604A and 604B, which may have one or more advantages. For example, imaging two "slices" of the sample at any one time may cut the number of required rotations of container 602 in half relative to the use of a single laser sheet and imager, or allow the thickness of the laser sheets to decrease, as discussed above in connection with FIG. 5.

In an alternative embodiment, imaging system 600 includes imager 604A, but imager 604B is omitted. In such an embodiment, imaging system 600 includes suitable optics (e.g., one or more mirrors, prisms, and/or other optical components) to cause the optical path of imager 604A to have both a first component aligning with direction 624A, and a second component aligning with direction 624B. Imager 604A may include a Bayer filter (e.g., a common color CCD or CMOS chip), for example, to capture and distinctly preserve the visual information provided by the illumination from each of laser sheets 610A, 610B. That is, the single imager 604A may, for each rotation of container 602, capture a composite image that includes information sufficient to re-create a first image corresponding to the color of laser sheet 610A (e.g., red), as well as a second image corresponding to the color of laser sheet 610B (e.g., green). Alternatively, imager 604A may include a camera with optics and filters suitable to map the visual information corresponding to the different colors to different parts of the camera sensor.

Figure 7:
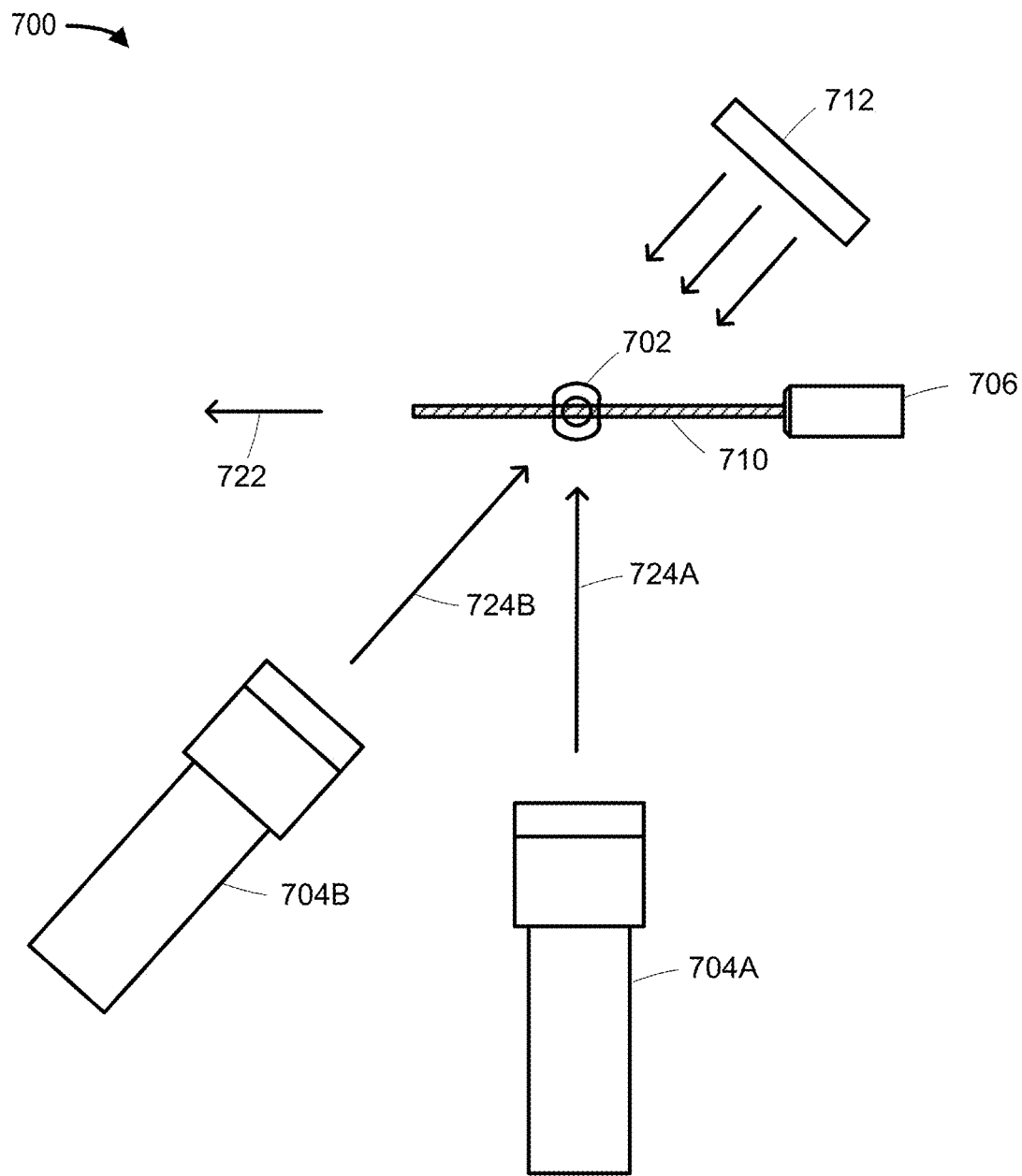
FIG. 7 depicts a fourth embodiment of an example imaging system operating according to the principles described herein.

FIG. 7 depicts yet another alternative embodiment, in which an imaging system 700 images a container 702 using a first imager 704A, a second imager 704B, a laser source 706 generating a laser sheet 710, and an additional illumination source 712. Referring to FIGS. 3A and 3B, container 702 may be similar to container 302, one or both of imagers 704A and 704B may be similar to imager 304, and laser source 706 may be similar to laser source 306, for example. Illumination source 712, however, may not produce a laser sheet, and indeed may not generate a laser at all. For example, illumination source 712 may be include one or more light-emitting diodes (LEDs) and/or another suitable light source that illuminates substantially the entire volume of container 702 at once. Laser sheet 710 (e.g., similar to laser sheet 310) impinges upon container 702 in a direction 722, an imaging axis 724A of imager 704A is substantially orthogonal to the direction 722, and an imaging axis 724B of imager 704B is neither parallel nor orthogonal to the direction 722. While illumination source 712 is shown in a back-lighting arrangement (relative to imager 704B) in FIG. 7, it is understood that, in some embodiments, illumination source 712 may be offset from the imaging axis 724B. For example, illumination source 712 may include one or more light sources positioned above and/or below the imaging axis 724B, and angled down and/or up to illuminate container 702 without providing a direct back light.

Laser source 706 and illumination source 712 generate light of different wavelengths/colors. For example, laser sheet 710 may be red, and the light produced by illumination source 712 may be blue. Moreover, optical filters of imagers 704A and 704B may be configured to pass the color of the corresponding illumination source (e.g., imager 704A may be configured to image red light but not blue light, and imager 704B may be configured to image blue light but not red light). By utilizing different colors, imaging system 700 allows simultaneous imaging by imagers 704A and 704B, which may have one or more advantages. For example, images generated by imager 704B may be used to identify particles anywhere in or on container 702 for motion tracking purposes, while images generated by imager 704A may be used to determine which of those particles are external to container 702.

In an alternative embodiment, imaging system 700 includes imager 704A but omits imager 704B. Similar to the arrangement discussed above in connection with FIG. 6, for example, imager 704A may implement a Bayer filter (or optics/filters that map different colors to different areas of the camera sensor), and imaging system 700 may include suitable additional optical components (e.g., mirror(s) and/or prism(s)) to provide imager 704A with optical path components along both direction 724A and 724B. In this manner, imager 704A may capture images that each preserve the visual information provided by the illumination from laser source 706 and the illumination from light source 712.

Figure 8:
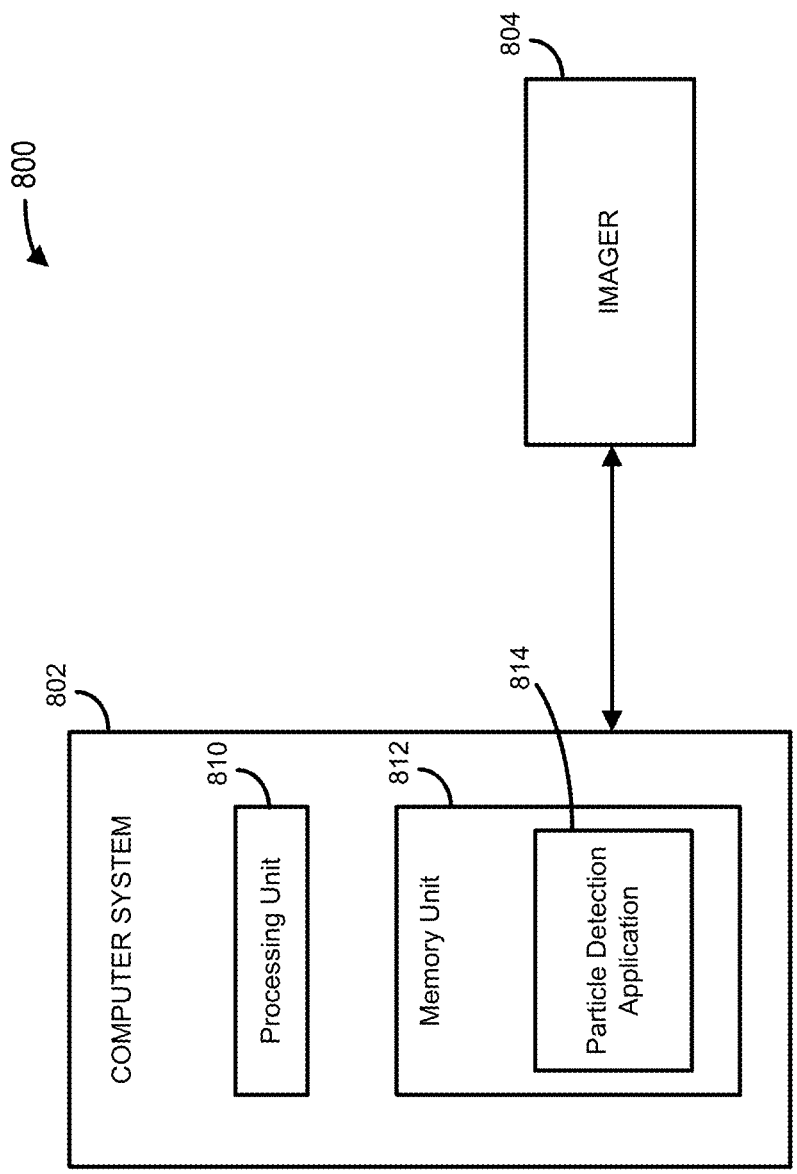
FIG. 8 is a simplified block diagram of an example automated inspection system that may be used with the imaging system of FIG. 3, 5, 6 or 7.

FIG. 8 is a simplified block diagram of an example automated inspection system 800 that may be utilized with any one of the imaging systems described above in connection with FIG. 3, 5, 6 or 7. Automated inspection system 800 includes a computer system 802, which receives images from an imager 804 (e.g., similar to imager 304). Imager 804 generates one or more images of a container holding a sample, while the container and sample are illuminated by a laser sheet as described in any of the various embodiments above.

Computer system 802 may be a general-purpose computer that is specifically programmed to perform the operations discussed herein, or may be a special-purpose computing device (e.g., a portion of an imaging unit that includes imager 804). As seen in FIG. 8, computer system 802 includes a processing unit 810 and a memory unit 812. In some embodiments, however, computer system 802 includes two or more computers that are either co-located or remote from each other. In these distributed embodiments, the operations described herein relating to processing unit 810 and/or memory unit 812 may be divided among multiple processing units and/or memory units, respectively.

Processing unit 810 constitutes processing means for analyzing images of containers to detect particles within, and/or on an exterior surface of, those containers. Processing unit 810 includes one or more processors, each of which may be a programmable microprocessor that executes software instructions stored in memory unit 812 to execute some or all of the functions of computer system 802 as described herein. Processing unit 810 may include one or more graphics processing units (GPUs) and/or one or more central processing units (CPUs), for example. Alternatively, or in addition, some of the processors in processing unit 810 may be other types of processors (e.g., ASICs, FPGAs, etc.), and some of the functionality of computer system 802 as described herein may instead be implemented in hardware. Memory unit 812 may include one or more volatile and/or non-volatile memories. Any suitable memory type or types may be included, such as read-only memory (ROM), random access memory (RAM), flash memory, a solid-state drive (SSD), a hard disk drive (HDD), and so on. Collectively, memory unit 812 may store the instructions of one or more software applications, the data received/used by those applications, and the data output/generated by those applications.

One such software application stored in memory unit 812 is a particle detection application 814 that, when executed by processing unit 810, process images generated by imager 804 (and possibly also images generated by one or more other imagers, such as imager 604B of FIG. 6 or 704B of FIG. 7) to detect particles within the sample (e.g., to determine a particle count within the sample) and/or to determine characteristics of those particles (e.g., particle sizes, types, etc.). Particle detection application 814 may also perform other operations, such as scoring a particular sample based on particle count, sizes, types, and/or other factors in order to determine whether the sample is acceptable or should be discarded.

In a relatively simple embodiment, particle detection application 814 may analyze all "slice" images for a particular container/sample (e.g., 90 images corresponding to 90 rotations of the container, with the laser sheet in a fixed orientation), and label anything appearing between the container walls as particles inside the container and anything appearing outside the container walls as particles outside the container. As indicated above, however, more complex algorithms may be used. For example, particle detection application 814 may label anything that appears between the container walls in any image as a "candidate particle," and then use a classifier (e.g., a trained neural network) to determine whether each candidate is indeed a particle, or instead a bubble (and/or to classify the type of particle, if not a bubble, etc.). As another example, particle detection application 814 may also analyze images from one or more additional imagers (e.g., imager 604B of FIG. 6 or imager 704B of FIG. 7) to more accurately detect, classify, and/or position particles within the container. For example, images from two imagers may be used to better determine three-dimensional particle positions within the container at a single time corresponding to a single rotation/position of the container (which may be needed if the sample is not very high viscosity, and particles/bubbles can move somewhat as the container is rotated from one position to the next). Particle detection application 814 may also, or instead, utilize any other suitable technique(s) to detect, classify, and/or position particles within the container and sample.

FIG. 9 is a flow diagram of an example method 900 for imaging a container holding a sample. Method 900 may be performed by one or more portions of imaging system 300, 500, 600 or 700, and/or by one or more portions of automated inspection system 800. For example, block 902 may be performed by one of laser sources 306, 506A, 606A and 706, block 904 may be performed by one of imagers 304, 504, 604A and 704A, and block 906 may be performed by computer system 802 (e.g., by processing unit 810 when executing instructions of particle detection application 814 stored in memory unit 812).

At block 902, the container is illuminated with a laser sheet that impinges upon the container in a first direction corresponding to a first axis (e.g., direction 322 corresponding/aligning to the first axis 330 in FIG. 3A). A plane of the laser sheet is defined by the first axis and a second, orthogonal axis (e.g., the second axis 332 in FIG. 3A). The laser sheet may pass through a central axis of the container (e.g., the central axis 320 of FIG. 3A), for example. The laser sheet is associated with a certain thickness along a third axis orthogonal to the first and second axes (e.g., the third axis 334 of FIG. 3A). Where the laser sheet enters the container, the thickness of the laser sheet may be greater than zero but less than 1 mm, less than 2 mm, less than 3 mm, less than 4 mm, less than 5 mm, and so on. Stated as a range, in various embodiments, the thickness is somewhere between 1 and 3 mm, somewhere between 1 and 5 mm, somewhere between 0.5 and 10 mm, and so on. In some embodiments, the thickness is between 1/360th and 1/30th of the perimeter (e.g., circumference) of the container. The laser sheet may include white light, or may be constrained to a narrower portion of the visible spectrum (e.g., a red laser sheet), for example.

At block 904, an image of the container, while illuminated by the laser sheet, is captured by an imager (e.g., imager 304, 504, 604A or 704A). The imager has an imaging axis (e.g., imaging axis 324 of FIG. 3A) that is substantially orthogonal to at least the first (and possibly also the second) axis.

At block 906, the image captured at block 904 is analyzed to detect particles within, and/or on an exterior surface of, the container. In some embodiments, external particles are "detected" only for purposes of discounting those particles (e.g., for quality control procedures where particles outside the container may not be of interest). Block 904 may also include classifying the particles that are inside the container (by type, size, etc.), counting particles that are inside the container, and/or one or more other operations.

In some embodiments, method 900 includes one or more additional blocks not shown in FIG. 9. For example, method 900 may include a first additional block in which the container is moved through a plurality of rotations, about a central axis of the container, while illuminating the container with the laser sheet. Method 900 may also include a second additional block in which a plurality of images of the container are captured by the imager (with each image corresponding to a respective one of the plurality of rotations), and a third additional block in which each of the plurality of images is analyzed to detect particles within, and/or on the exterior surface of, the container.

In some embodiments, the laser sheet is a first color (e.g., red), and the imager is configured to filter out colors other than that first color. In one such embodiment, method 900 includes a first additional block in which, simultaneously with illuminating the container with the laser sheet, the container is illuminated with a second laser sheet of a different color (e.g., blue). The second laser sheet may impinge upon the container in a second direction that is not parallel to the first axis (i.e., not parallel to the direction of the other laser sheet), and a plane of the second laser sheet may be defined by that second direction and a third direction substantially parallel to the second axis. Method 900 may also include a second additional block in which an additional image of the container is captured by an additional imager, with the additional imager being configured to filter out colors other than the color of the second laser sheet, and having an imaging axis that is substantially orthogonal to at least the second (and possibly the third) direction. The additional image may be captured simultaneously with the image captured at block 904, for example. Block 906 may then include analyzing both images of the container to detect the particles.

In yet another embodiment, the laser sheet is a first color (e.g., red), and the imager is configured to filter out colors other than that first color, as in the above example. In this embodiment, however, method 900 includes a first additional block in which, simultaneously with illuminating the container with the laser sheet, the container is illuminated with light of a different color (e.g., blue) that illuminates all, or at least a majority, of the volume/contents of the container. Method 900 may also include a second additional block in which an additional image of the container is captured by an additional imager, with the additional imager being configured to filter out colors other than the color of the additional (e.g., non-laser) light source. The additional image may be captured simultaneously with the image captured at block 904, for example. Block 906 may then include analyzing both images of the container to detect the particles.

Although the systems, methods, devices, and components thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent that would still fall within the scope of the claims defining the invention.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for imaging a container holding a sample, the method comprising:
   illuminating the container with a laser sheet that impinges upon the container in a first direction corresponding to a first axis, wherein a plane of the laser sheet is defined by the first axis and a second axis orthogonal to the first axis;
   moving the container through a plurality of rotations, about a central axis of the container, while illuminating the container with the laser sheet;
   capturing, by an imager having an imaging axis that is substantially orthogonal to at least the first axis, a plurality of images of the container, with each image corresponding to a respective one of the plurality of rotations; and
   analyzing, by one or more processors, the plurality of images of the container to detect particles within, and/or on an exterior surface of, the container, wherein analyzing the plurality of images includes (i) identifying an object appearing between walls of the container, in a first image corresponding to a first rotation of the container, as a candidate particle, and (ii) determining whether the candidate particle is an actual particle based on whether the object appears in a second image corresponding to a second rotation of the container.

2. The method of claim 1, wherein illuminating the container with the laser sheet includes illuminating the container with a laser sheet that passes through a central axis of the container.

3. The method of claim 1, wherein a thickness of the laser sheet, at a position where the laser sheet enters the container and along a third axis orthogonal to the first and second axes, is less than 3 millimeters.

4. The method of claim 1, wherein a thickness of the laser sheet covers between $1/360^{th}$ and $1/30^{th}$ of a perimeter of the container.

5. The method of claim 1, wherein:
   the laser sheet is a first laser sheet of a first color;
   the imager is a first imager configured to filter out colors other than the first color;
   the method further comprises
      simultaneously with illuminating the container with the first laser sheet, illuminating the container with a second laser sheet of a second color different than the first color, wherein the second laser sheet impinges upon the container in a second direction that is not parallel to the first axis, and wherein a plane of the second laser sheet is defined by the second direction and a third direction substantially parallel to the second axis, and capturing, by an additional imager configured to filter out colors other than the second color and having an imaging axis that is substantially orthogonal to at least the second direction, additional images of the container; and analyzing the plurality of images of the container includes analyzing both the plurality of images of the container and the additional images of the container to detect particles within, and/or on an exterior surface of, the container.

6. The method of claim 1, wherein:

the laser sheet is a laser sheet of a first color;

the imager is a first imager configured to filter out colors other than the first color;

the method further comprises simultaneously with illuminating the container with the laser sheet, illuminating the container with light of a second color different than the first color, wherein the light of the second color illuminates at least a majority of an entire volume of the container, and capturing, by an additional imager configured to filter out colors other than the second color, additional images of the container; and analyzing the plurality of images of the container includes analyzing both the plurality of images of the container and the additional images of the container to detect particles within, and/or on an exterior surface of, the container.

7. The method of claim 1, wherein the first direction is substantially orthogonal to a central axis of the container.

8. The method of claim 1, wherein the imaging axis is substantially orthogonal to the first axis and the second axis.

9. An imaging system comprising:

illumination means for generating a laser sheet that impinges upon a container in a first direction corresponding to a first axis, wherein a plane of the laser sheet is defined by the first axis and a second axis orthogonal to the first axis;

positioning means for positioning the container, wherein the positioning means moves the container through a plurality of rotations, about a central axis of the container, while the illumination means illuminates the container with the laser sheet;

imaging means for capturing a plurality of images of the container, with each image corresponding to a respective one of the plurality of rotations, the means for capturing the plurality of images of the container having an imaging axis that is substantially orthogonal to at least the first axis; and processing means for analyzing the plurality of images of the container to detect particles within, and/or on an exterior surface of, the container, wherein analyzing the plurality of images includes (i) identifying an object appearing between walls of the container, in a first image corresponding to a first rotation of the container, as a candidate particle, and (ii) determining whether the candidate particle is an actual particle based on whether the object appears in a second image corresponding to a second rotation of the container.

10. The imaging system of claim 9, wherein the illumination means is for generating a laser sheet that passes through a central axis of the container.

11. The imaging system of claim 9, wherein the illumination means is for generating a laser sheet having a thickness, at a position where the laser sheet enters the container and along a third axis orthogonal to the first and second axes, of less than 3 millimeters.

12. The imaging system of claim 9, wherein the illumination means is for generating a laser sheet having a thickness that covers between $1/360^{th}$ and $1/30^{th}$ of a perimeter of the container.

13. The imaging system of claim 9, wherein:

the illumination means is a first illumination means for generating a first laser sheet of a first color;

the imaging means is a first imaging means for filtering out colors other than the first color; and the imaging system further comprises a second illumination means for generating a second laser sheet, of a second color different than the first color, that impinges upon the container in a second direction that is not parallel to the first axis, wherein a plane of the second laser sheet is defined by the second direction and a third direction substantially parallel to the second axis, and a second imaging means for filtering out colors other than the second color, is positioned to capture images of the container, and has an imaging axis aligned with a fifth direction orthogonal to at least the second direction.

14. The imaging system of claim 9, wherein:

the illumination means is a first illumination means for generating a first laser sheet of a first color;

the imaging means is a first imaging means for filtering out colors other than the first color; and the imaging system further comprises a second illumination means for illuminating the container with light of a second color different than the first color, wherein the light of the second color illuminates at least a majority of an entire volume of the container, and a second imaging means for filtering out colors other than the second color, and is positioned to capture images of the container.

15. The imaging system of claim 9, wherein the first direction is substantially orthogonal to a central axis of the container.

* * * * *